US010275867B1

(12) United States Patent
Pathapati et al.

(10) Patent No.: US 10,275,867 B1
(45) Date of Patent: *Apr. 30, 2019

(54) UTILIZING A MACHINE LEARNING MODEL TO AUTOMATICALLY VISUALLY VALIDATE A USER INTERFACE FOR MULTIPLE PLATFORMS

(71) Applicant: Capital One Services, LLC, McLean, VA (US)

(72) Inventors: Prasad Pathapati, Frisco, TX (US); Deepa Mohan, Frisco, TX (US); Mark Morrison, Rowlett, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/014,477

(22) Filed: Jun. 21, 2018

Related U.S. Application Data

(63) Continuation of application No. 15/900,306, filed on Feb. 20, 2018, now Pat. No. 10,043,255.

(51) Int. Cl.
*G06T 7/00* (2017.01)
*G06F 9/451* (2018.01)
*G06K 9/62* (2006.01)
*G06N 20/00* (2019.01)

(52) U.S. Cl.
CPC ............ *G06T 7/0002* (2013.01); *G06F 9/451* (2018.02); *G06K 9/6202* (2013.01); *G06N 20/00* (2019.01); *G06T 2207/20081* (2013.01); *G06T 2207/30168* (2013.01); *G06T 2207/30176* (2013.01)

(58) Field of Classification Search
CPC ......... G06T 7/0002; G06T 2207/30176; G06T 2207/20081; G06T 2207/30168; G06F 9/451; G06K 9/6202; G06N 99/005
See application file for complete search history.

(56) References Cited

U.S. PATENT DOCUMENTS

2011/0093773 A1  4/2011  Yee
2011/0219012 A1  9/2011  Yih
2012/0269441 A1  10/2012  Marchesotti
2013/0083996 A1  4/2013  Prasad et al.
(Continued)

OTHER PUBLICATIONS

Co-pending U.S. Appl. No. 15/900,306, filed Feb. 20, 2018, entitled "Utilizing a Machine Learning Model to Automatically Visually Validate a User Interface for Multiple Platforms," by Prasad Pathapati et al., 59 pages.

Primary Examiner — Carol Wang
(74) Attorney, Agent, or Firm — Harrity & Harrity, LLP

(57) ABSTRACT

A device receives user interface information associated with a user interface to be provided for a particular platform, and receives design information for a design of the user interface to be provided for the particular platform. The device receives a request to visually compare the user interface information and the design information, and utilizes, based on the request, a trained machine learning model to visually compare the user interface information and the design information. The device generates information, indicating defects in the user interface information, based on utilizing the trained machine learning model to visually compare the user interface information and the design information, where the defects include user interface information that does not visually match the design information. The device provides the information indicating the defects in the user interface information.

20 Claims, 11 Drawing Sheets

(56) References Cited

U.S. PATENT DOCUMENTS

| | | |
|---|---|---|
| 2014/0052821 A1 | 4/2014 | Prasad |
| 2014/0189576 A1 | 6/2014 | Carmi |
| 2014/0343957 A1 | 11/2014 | Dejori |
| 2017/0116179 A1 | 4/2017 | Gagne-Langevin |
| 2017/0192797 A1 | 7/2017 | Snir |
| 2017/0294010 A1 | 10/2017 | Shen |
| 2018/0060469 A1 | 3/2018 | Morgan |

UTILIZING A MACHINE LEARNING MODEL TO AUTOMATICALLY VISUALLY VALIDATE A USER INTERFACE FOR MULTIPLE PLATFORMS

CROSS-REFERENCE TO RELATED APPLICATIONS UNDER 35 U.S.C. § 120

This application is a continuation of U.S. patent application Ser. No. 15/900,306, filed on Feb. 20, 2018, entitled "UTILIZING A MACHINE LEARNING MODEL TO AUTOMATICALLY VISUALLY VALIDATE A USER INTERFACE FOR MULTIPLE PLATFORMS," which is hereby expressly incorporated by reference herein.

BACKGROUND

Responsive web design (RWD) is an approach to web design which makes user interfaces for web pages render well on a variety of platforms (e.g., mobile devices, tablet devices, desktop devices, etc. with various window and/or screen sizes). An extension of responsive web design also considers viewer proximity as part of viewing context. Content, design, and performance are necessary across all platforms in order to ensure usability and user satisfaction.

SUMMARY

According to some implementations, a device includes one or more memories, and one or more processors communicatively coupled to the one or more memories. The one or more processors may be configured to receive user interface information associated with a user interface to be provided for a particular platform, and receive design information for a design of the user interface to be provided for the particular platform. The one or more processors may be configured to receive a request to visually compare the user interface information and the design information, and utilize, based on the request, a trained machine learning model to visually compare the user interface information and the design information. The one or more processors may be configured to generate information, indicating defects in the user interface information, based on utilizing the trained machine learning model to visually compare the user interface information and the design information, where the defects may include user interface information that does not visually match the design information. The one or more processors may be configured to provide the information indicating the defects in the user interface information.

According to some implementations, a method may include receiving, by a device, design information for a design of a user interface to be provided for multiple platforms, where the multiple platforms may include different display areas for displaying the user interface. The method may include storing, by the device, the design information, and receiving, by the device, user interface information associated with the user interface to be provided for the multiple platforms. The method may include receiving, by the device and from a client device, a request to visually compare the user interface information and the design information, and utilizing, by the device and based on the request, a trained machine learning model to visually compare the user interface information and the design information. The method may include generating, by the device, information, indicating defects in the user interface information, based on utilizing the trained machine learning model to visually compare the user interface information and the design information, where the defects may include user interface information that does not visually match the design information. The method may include providing, by the device, the information indicating defects in the user interface information for display to the client device.

According to some implementations, a non-transitory computer-readable medium may store instructions that include one or more instructions that, when executed by one or more processors of a device, cause the one or more processors to receive historical user interface information associated with multiple platforms, where the multiple platforms may include different display areas for displaying a same user interface. The one or more instructions may cause the one or more processors to train a machine learning model with the historical user interface information, and generate a trained machine learning model based on training the machine learning model with the historical user interface information. The one or more instructions may cause the one or more processors to receive user interface information associated with the user interface to be provided for a particular platform of the multiple platforms, and receive design information for a design of a user interface to be provided for the particular platform. The one or more instructions may cause the one or more processors to receive a request to visually compare the user interface information and the design information, and utilize, based on the request, the trained machine learning model to visually compare the user interface information and the design information. The one or more instructions may cause the one or more processors to generate an information, indicating defects in the user interface information, based on utilizing the trained machine learning model to visually compare the user interface information and the design information, where the defects may include user interface information that does not visually match the design information. The one or more instructions may cause the one or more processors to provide the information indicating the defects in the user interface information.

DETAILED DESCRIPTION

The following detailed description of example implementations refers to the accompanying drawings. The same reference numbers in different drawings may identify the same or similar elements.

In some enterprises, a web design process may begin with a design file (e.g., design information) that includes renderings of user interfaces. The user interface designs may be approved within the enterprise to ensure the content or design is compliant with regulatory requirements (if applicable) and/or to ensure that the user interface designs adhere to enterprise standards of design and aesthetic qualities. Once a design is approved, web and/or application developers may then be tasked to generate code for implementing the approved design for each of a plurality of platforms. Testing of user interfaces of applications, developed using responsive web design, for multiple platforms (e.g., mobile devices, tablet devices, desktop devices, etc. with various window and/or screen sizes) poses a significant challenge to application developers and testers to ensure that every user interface displays as expected. Currently, testing of user interfaces across multiple platforms is a manual and tedious process, but is required in order to deliver a high quality customer experience. However, the human eye is incapable of identifying visual defects in user interfaces consistently and accurately, and the manual process is not repeatable and prone to errors.

Some implementations described herein may provide a validation platform that automatically visually validates a user interface for multiple platforms. In some implementations, the validation platform may utilize a machine learning model to perform the validation. For example, the validation platform may receive user interface information, design information for user interfaces, and a request to visually compare the user interface information and the design information. In some implementations, the validation platform may perform a pixel by pixel comparison (or comparisons among pixel groups) of the user interface information and the design information (or particular aspects thereof) to identify differences or defects between the two. In some implementations, the validation platform may utilize, based on the request, a trained machine learning model to visually compare the user interface information and the design information, and may generate information, indicating differences or defects in the user interface information, based on utilizing the trained machine learning model. The validation platform may generate recommendations for correcting the defects, and may generate code for correcting the defects. The validation platform may provide, for display, the information indicating the defects and/or the recommendations for correcting the defects, and/or may cause the code for correcting the defects to be implemented.

Figure 1A:
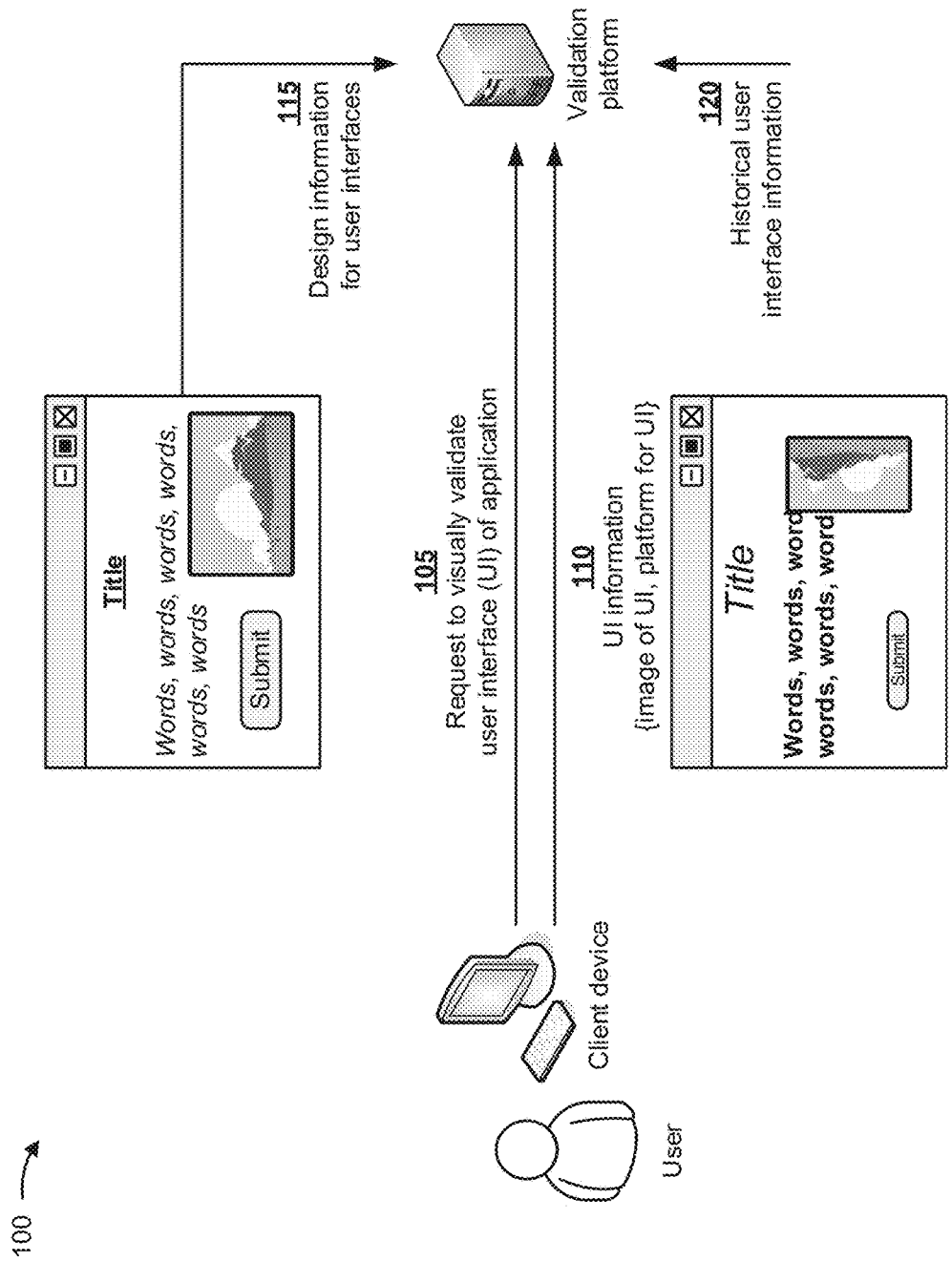
FIGS. 1A-1G are diagrams of an overview of an example implementation described herein.

FIGS. 1A-1G are diagrams of an overview of an example implementation 100 described herein. As shown in FIG. 1A, a user may be associated with a client device and a validation platform. Assume that the user wishes to visually validate a user interface of an application for a platform. As further shown in FIG. 1A, and by reference number 105, the user may cause the client device to provide, to the validation platform, a request to visually validate the user interface for the application, and the validation platform may receive the request. In some implementations, the validation platform may not receive a request to visually validate the user interface, but may automatically visually validate the user interface when the user interface is created. As further shown by reference number 110, the user may also cause the client device to provide user interface information to the validation platform, and the validation platform may receive the user interface information. In some implementations, the validation platform may not receive the user interface information from the client device, but may automatically retrieve the user interface information when the user interface is created. In some implementations, the user interface information may include an image of the user interface, information indicating a platform for the user interface, code used to generate the user interface, and/or the like. In some implementations, the validation platform may emulate the multiple platforms, and may generate coded user interfaces for each of the multiple platforms. In such implementations, the validation platform may perform a screen capture of the generated user interfaces, and may compare the generated user interfaces with design information, as described elsewhere herein.

As further shown in FIG. 1A, and by reference number 115, the validation platform may receive (e.g., from application developers) design information for user interfaces of the application. In some implementations, the design information may include information indicating how the user interfaces of the application are to visually appear on different platforms (e.g., a television, a desktop computing device, a tablet computing device, a handheld device, a smartphone device, a wearable device, and/or the like). In some implementations, the design information may include images of the user interfaces for the different platforms, information indicating the different platforms for the user interfaces, code used to generate the user interfaces, and/or the like.

As further shown in FIG. 1A, and by reference number 120, the validation platform may receive (e.g., from application developers) historical user interface information. In some implementations, the historical user interface information may be used to train a machine learning model (e.g., described elsewhere herein), and may include information indicating how prior user interfaces of prior applications visually appear on different platforms. In some implementations, the historical user interface information may include images of the prior user interfaces for the different platforms, information indicating the different platforms for the prior user interfaces, code used to generate the prior user interfaces, and/or the like.

Figure 1B:
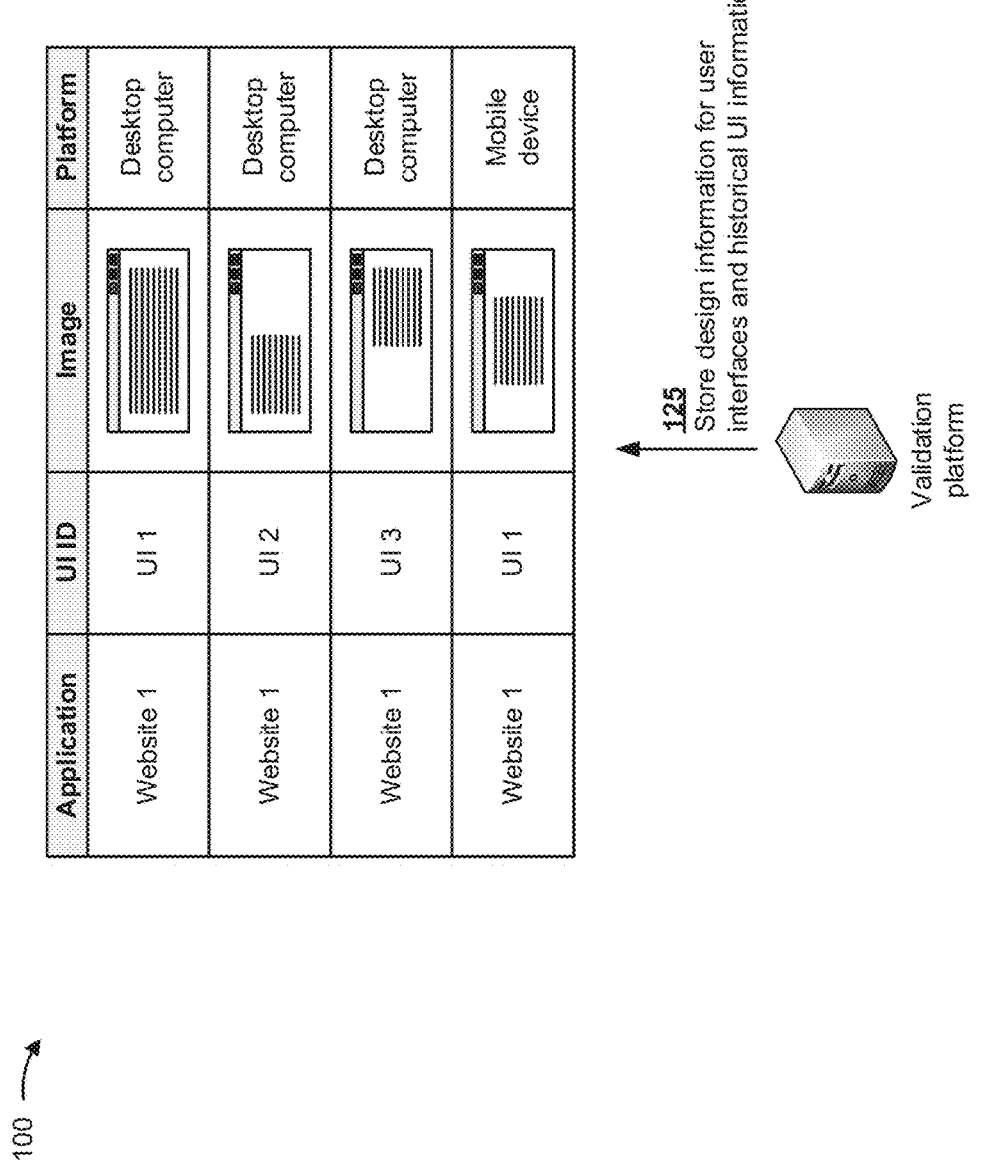

As shown in FIG. 1B, and by reference number 125, the validation platform may store the design information for the user interfaces and the historical user interface information in a data structure, such as a database, a table, a linked list, and/or the like associated with the validation platform. In some implementations, the data structure may include an application name field (e.g., Website 1, Website 2, etc.) for storing application names, a user interface identifier (ID) field (e.g., UI 1, UI 2, UI 3, etc.) for storing user interface identifiers, an image field for storing user interface images, a platform field for storing information identifying platforms (e.g., desktop computer, mobile device, tablet device, laptop device, etc.), and/or the like, associated with the design information and/or the historical user interface information.

In some implementations, the validation platform may securely store the design information and/or the historical user interface information by encrypting the design information and/or the historical user interface information using an encryption technology. For example, the design information and/or the historical user interface information may be securely stored using symmetric-key (or single-key) encryption technology. Using symmetric-key encryption technology, a single key, which is shared by the validation platform and the user, may be used to encrypt and decrypt the design information and/or the historical user interface information. Example symmetric-key technologies may include the advanced encryption standard (AES), the data encryption standard (DES), the triple DES, serpent, twofish, blowfish, the international data encryption algorithm (IDEA), and/or the like.

In some implementations, the design information and/or the historical user interface information may be securely stored using an asymmetric-key (or public-key-private-key) encryption technology. Using the asymmetric-key encryption technology, the design information and/or the historical user interface information may be encrypted with a private key, and decrypted with a public key, to verify that the design information and/or the historical user interface information was encrypted using the corresponding private key. Example asymmetric-key encryption technologies may include the digital signal algorithm (DSA), the Rivest-Shamir-Adleman (RSA), the Diffie-Hellman key exchange, key serialization, asymmetric utilities, and/or the like.

In some implementations, the design information and/or the historical user interface information may be securely stored by applying a cryptographic hash function to the design information and/or the historical user interface information. The cryptographic hash function may be used to verify the integrity of files and/or messages, verify passwords, and/or the like. Example cryptographic hash functions may include the secure hash algorithm 1 (SHA-1), the secure hash algorithm 2 (SHA-2), the secure hash algorithm 3 (SHA-3), the message digest 5 (MD5), and/or the like.

Figure 1C:
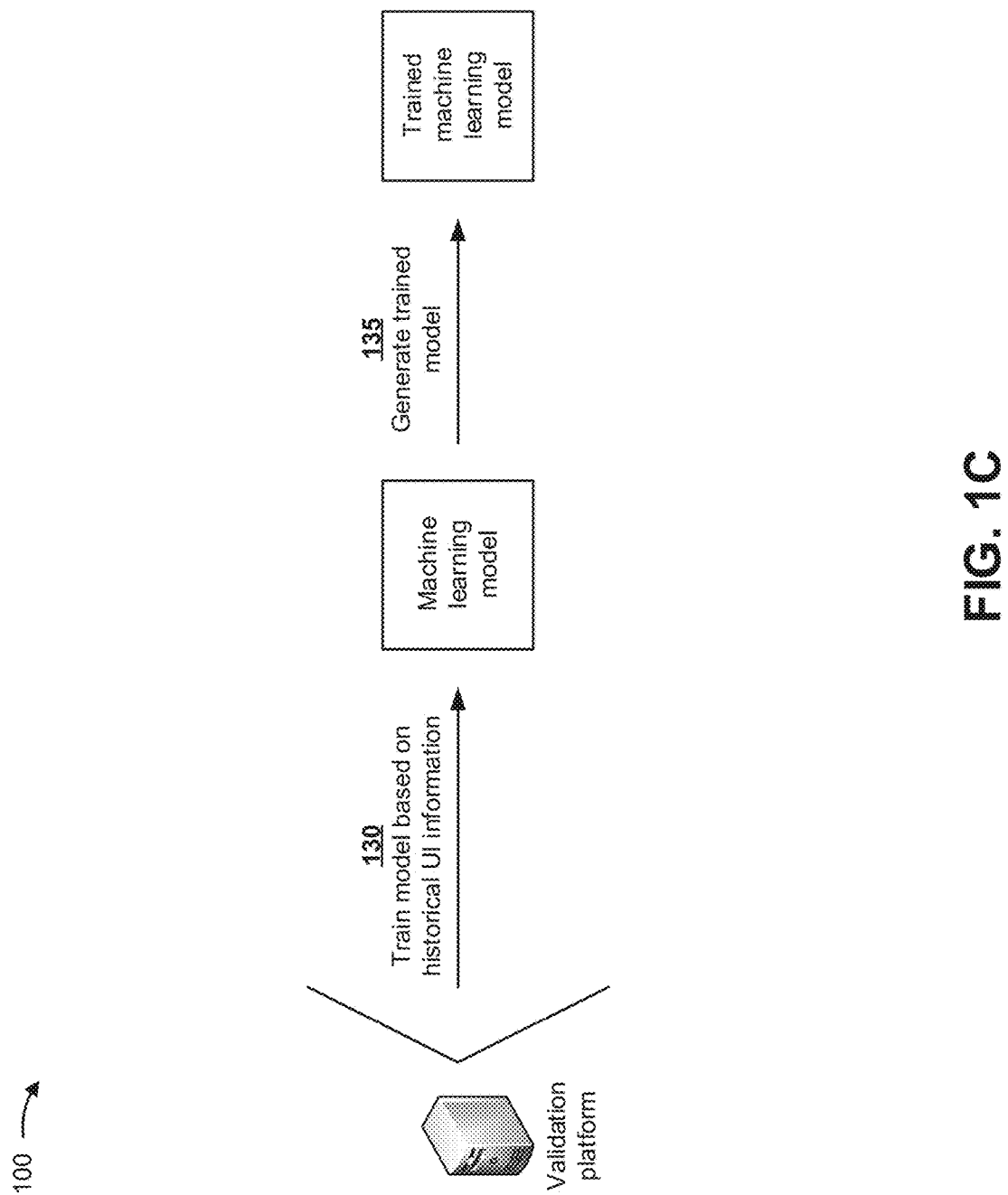

As shown in FIG. 1C, and by reference number 130, the validation platform may train a machine learning model based on the historical user interface information. In some implementations, the machine learning model may include a color selection model, a Canny edge model, a region of interest model, a Hough transform line detection model, and/or the like, described elsewhere herein. In some implementations, the validation platform may train the machine learning model by providing the historical user interface information (e.g., training data) to the machine learning model, and receiving predictions (e.g., indicating whether the prior user interfaces of prior applications visually appear correct on different platforms) based on providing the historical user interface information to the machine learning model. Based on the predictions, the validation platform may update the machine learning model, and may provide the historical user interface information to the updated machine learning model. The validation platform may repeat this process until correct predictions are generated by the machine learning model.

As further shown in FIG. 1C, and by reference number 135, once the correct predictions are generated by the machine learning model, the validation platform may output or generate the final version of the machine learning model as a trained machine learning model (e.g., a trained color selection model, a trained Canny edge model, a trained region of interest model, a trained Hough transform line detection model, and/or the like). In some implementations, the validation platform may utilize the trained machine learning model to automatically visually validate a user interface for multiple platforms.

Figure 1D:
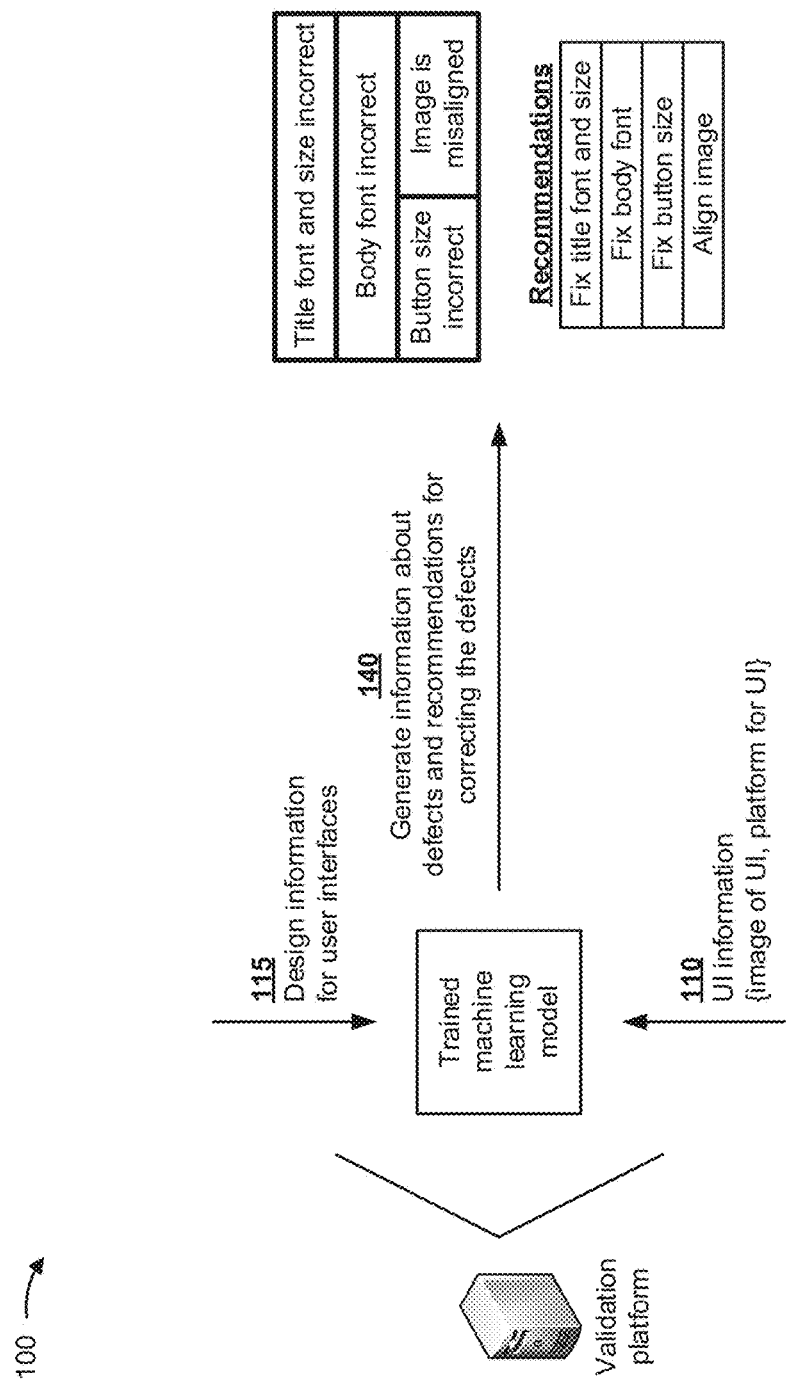

As shown in FIG. 1D, and by reference numbers 110 and 115, the validation platform may utilize the trained machine learning model, with the user interface information and the design information, in order to visually compare the user interface information and the design information. In some implementations, the trained machine learning model may visually compare the user interface information and the design information in order to determine whether the user interface information visually matches the design information. In some implementations, if the user interface information matches the design information, the validation platform (e.g., via the trained machine learning method) may generate information indicating that the user interface information matches the design information. In some implementations, the validation platform may validate both aesthetic aspects (e.g., layout, sizing, positioning, color etc.,) of the user interface information, and accuracy of content of the user interface information. In such implementations, the user interface may be ready to be implemented in the platform identified in the user interface information.

In some implementations, as shown by reference number 140 in FIG. 1D, if the user interface information does not match the design information, the validation platform (e.g., via the trained machine learning method) may generate information indicating defects in the user interface information, and information indicating recommendations for correcting the defects in the user interface information. In such implementations, the user interface may not be ready to be implemented in the platform identified in the user interface information until the defects are corrected. For example, the validation platform may generate information about particular defects (e.g., title font and size are incorrect, body font incorrect, colors not matched, button size incorrect, and image is misaligned, as well as any anomalies in the content itself) in the user interface information, and may generate particular recommendations (e.g., fix title font and size, fix body font, fix button size, and align image) for correcting the defects.

Figure 1E:
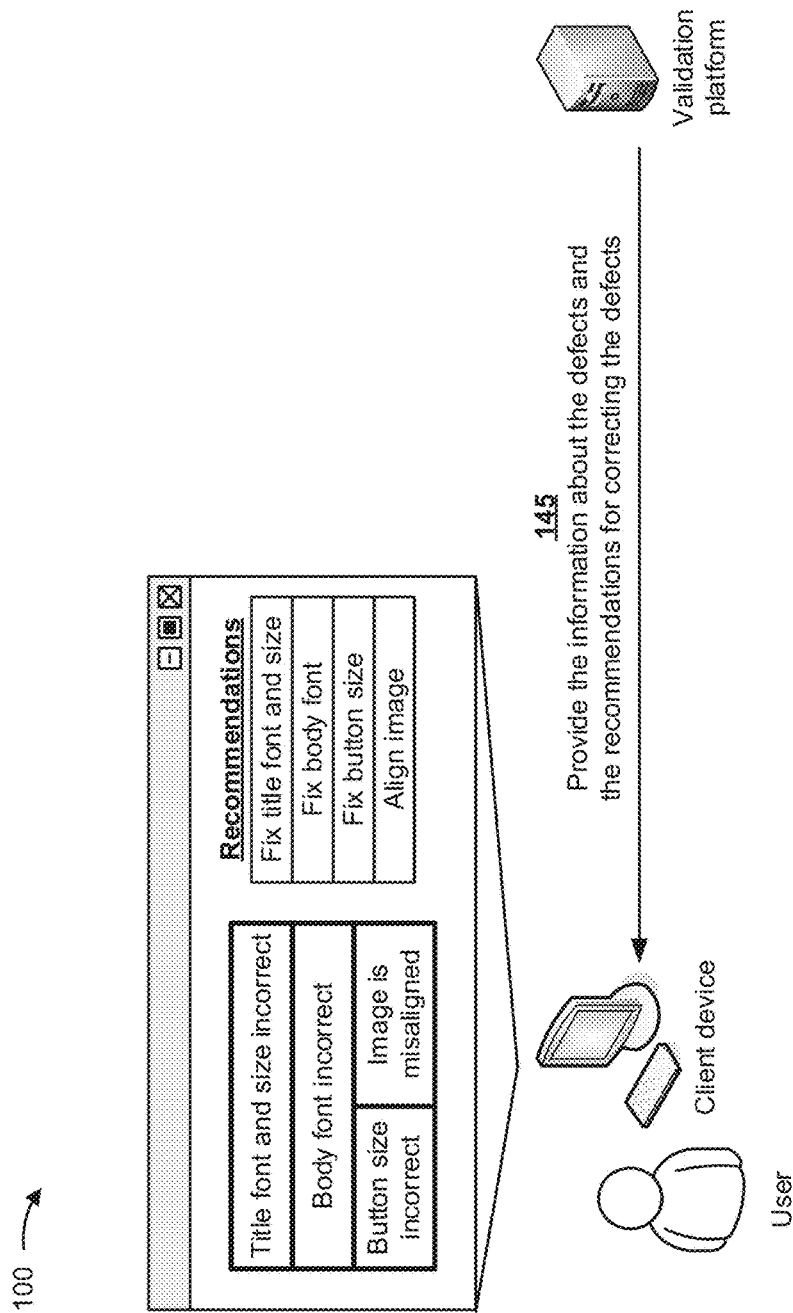

As shown in FIG. 1E, and by reference number 145, the validation platform may provide the information about the defects and the recommendations for correcting the defects to the client device. The client device may receive the information about the defects and the recommendations for correcting the defects, and may provide the information about the defects and the recommendations for correcting the defects for display to the user via a user interface. In some implementations, the user may utilize the information about the defects and/or the recommendations in order to correct the defects in the user interface.

Figure 1F:
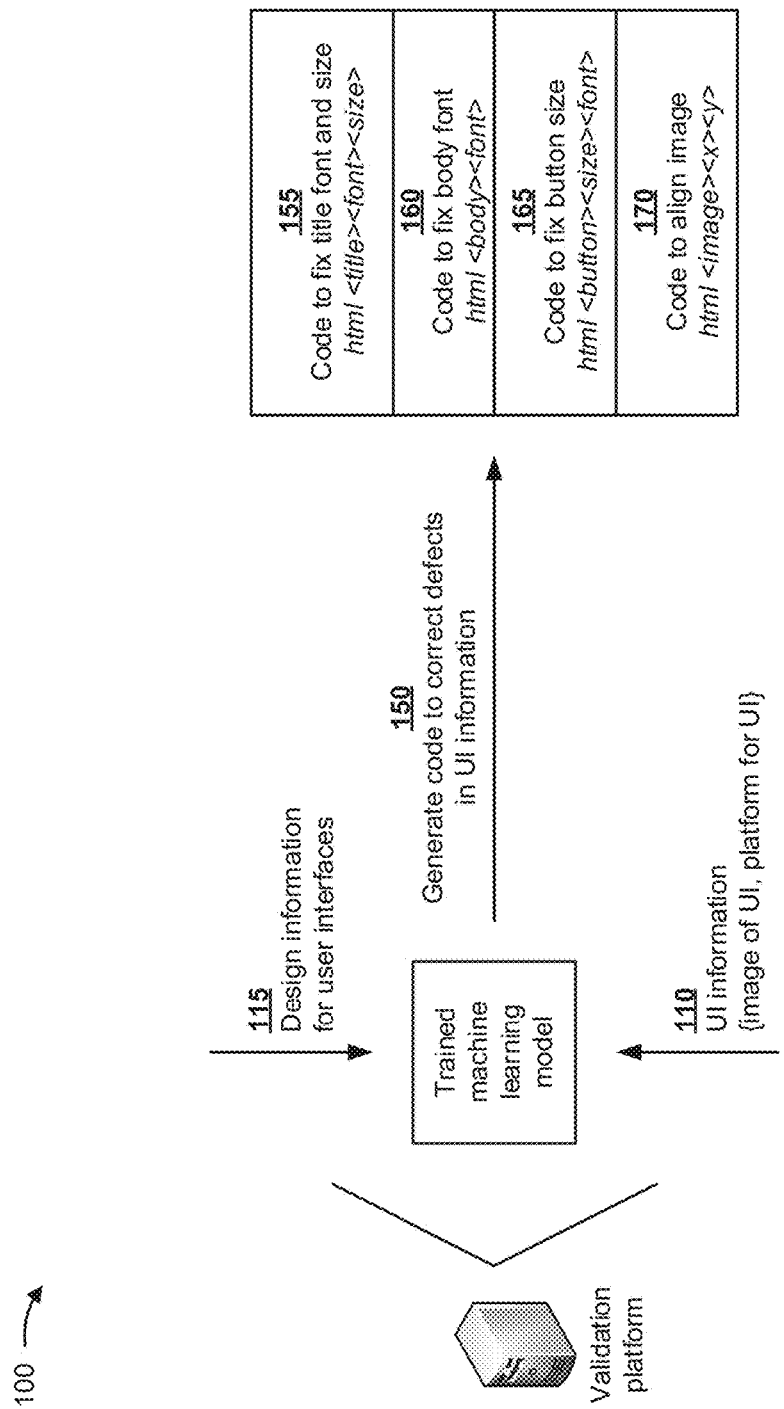

As shown in FIG. 1F, and by reference numbers 110 and 115, the validation platform may utilize the trained machine learning model, with the user interface information and the design information, in order to visually compare the user interface information and the design information, as described above. In some implementations, as shown by reference number 150 in FIG. 1F, if the user interface information does not match the design information, the validation platform (e.g., via the trained machine learning method) may generate code to correct the defects in the user interface information. For example, as shown by reference numbers 155, 160, 165, and 170 in FIG. 1F, the validation platform may generate particular code (e.g., code to fix title font and size, code to fix body font, code to change pixel colors, code to fix button size, and code to align image) for correcting the defects.

Figure 1G:
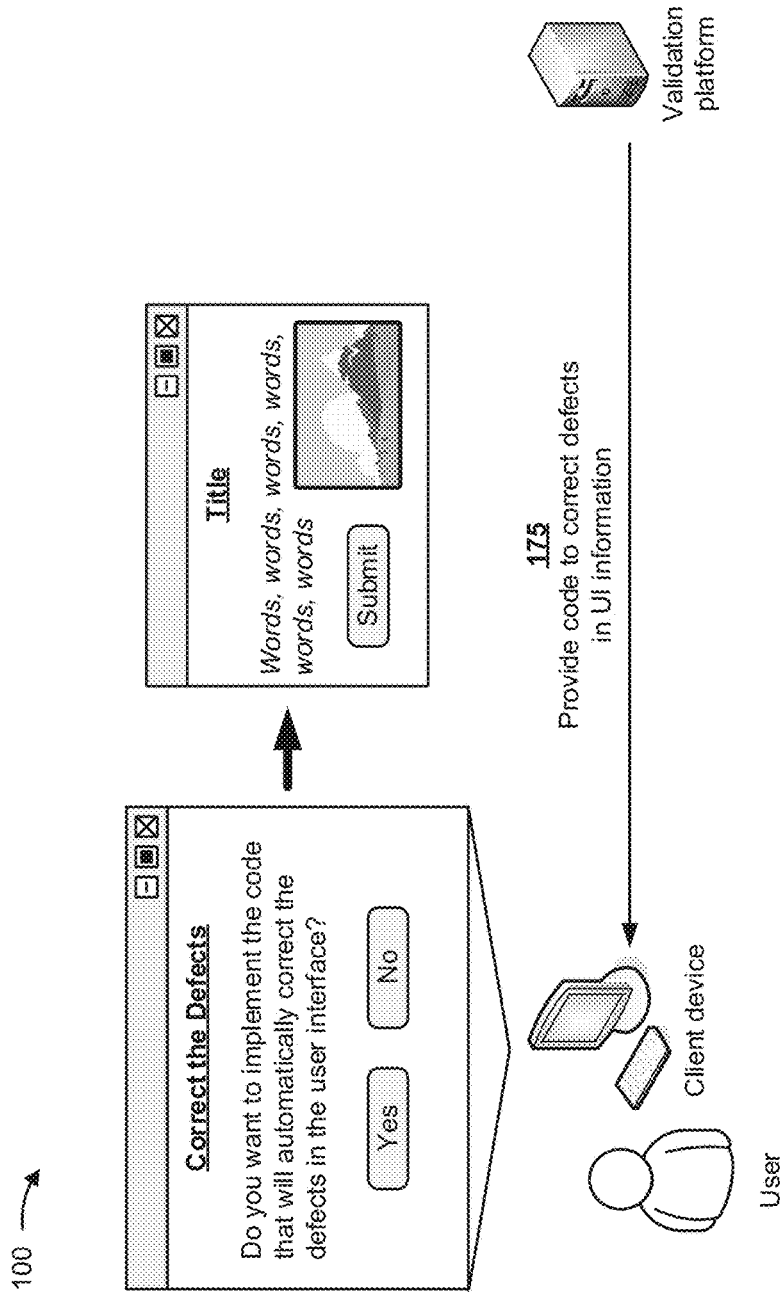

As shown in FIG. 1G, and by reference number 175, the validation platform may provide the code for correcting the defects in the user interface information to the client device. The client device may receive the code for correcting the defects, and may provide a user interface for display to the user based on receiving the code for correcting the defects. In some implementations, the user interface may include information inquiring whether the user wants to implement the code for correcting the defects in the user interface information. In some implementations, if the user elects to utilize the code for correcting the defects, the client device may cause the code for correcting the defects to be implemented so that the defects in the user interface information are corrected and a correct user interface is output.

In this way, the validation platform may utilize machine learning models to automatically visually validate a user interface for multiple platforms, which may improve speed and efficiency associated with visually validating the user interface, and may conserve computing resources (e.g., processors, memory, and/or the like). Furthermore, implementations described herein use a computerized process to perform tasks or roles that were not previously performed or were previously performed using subjective human intuition or input. For example, prior solutions require manual testing of user interfaces across multiple platforms, which is a tedious and unrepeatable process that is prone to errors. Finally, utilizing machine learning models to automatically visually validate a user interface for multiple platforms conserves computing resources (e.g., processors, memory, and/or the like) that would otherwise be wasted in unsuccessfully attempting to visually validate a user interface for multiple platforms.

As indicated above, FIGS. 1A-1G are provided merely as examples. Other examples are possible and may differ from what was described with regard to FIGS. 1A-1G.

Figure 2:
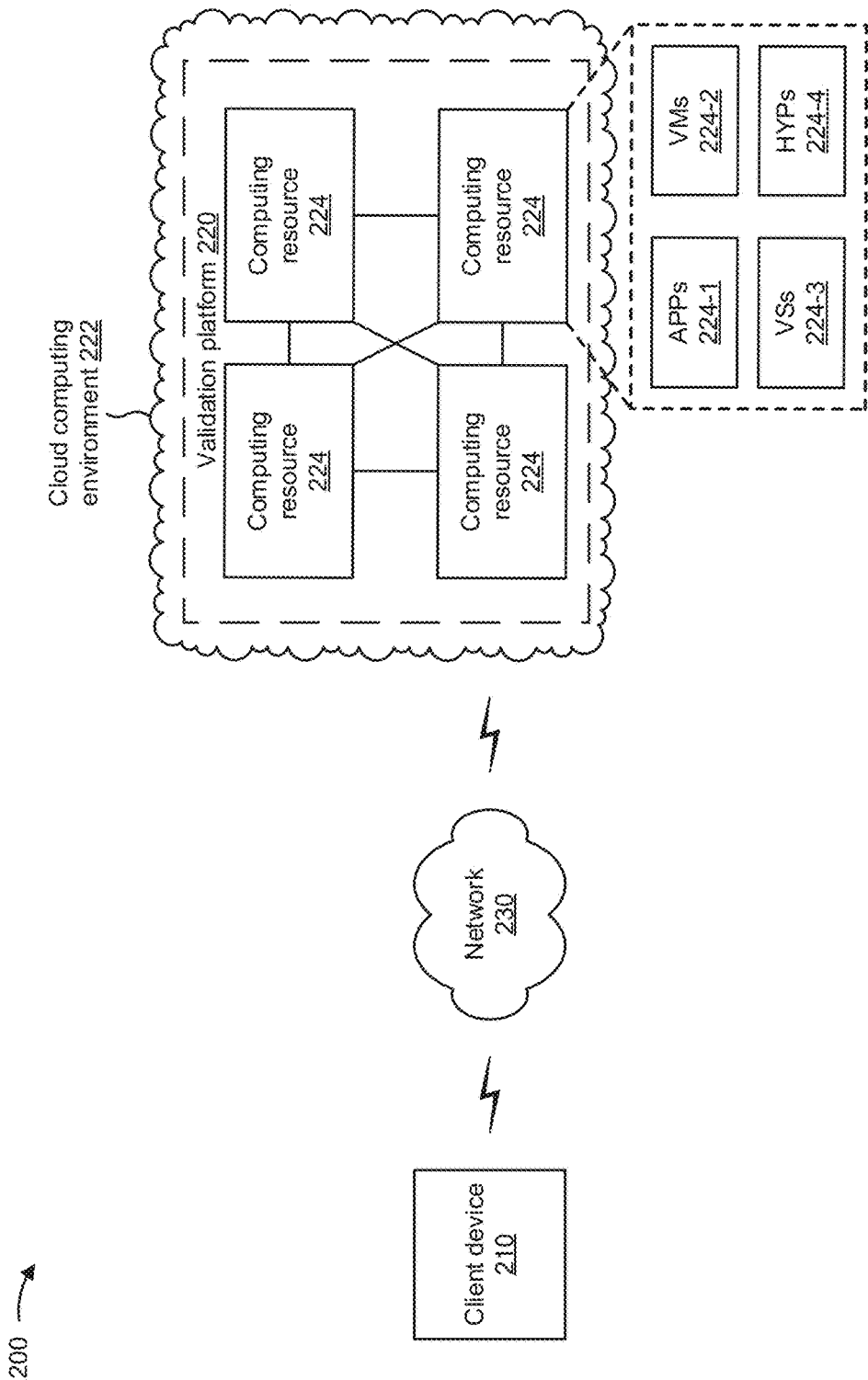
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a validation platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, client device 210 may receive information from and/or transmit information to validation platform 220.

Validation platform 220 includes one or more devices that utilize a machine learning model to automatically visually validate a user interface for multiple platforms. In some implementations, validation platform 220 may be designed to be modular such that certain software components may be swapped in or out depending on a particular need. As such, validation platform 220 may be easily and/or quickly reconfigured for different uses. In some implementations, validation platform 220 may receive information from and/or transmit information to one or more client devices 210.

In some implementations, as shown, validation platform 220 may be hosted in a cloud computing environment 222. Notably, while implementations described herein describe validation platform 220 as being hosted in cloud computing environment 222, in some implementations, validation platform 220 may not be cloud-based (i.e., may be implemented outside of a cloud computing environment) or may be partially cloud-based. In some implementations, validation platform 220 may emulate the multiple platforms utilizing one or more components of cloud computing environment 222, based on details associated with the multiple platforms.

Cloud computing environment 222 includes an environment that hosts validation platform 220. Cloud computing environment 222 may provide computation, software, data access, storage, etc. services that do not require end-user knowledge of a physical location and configuration of system(s) and/or device(s) that hosts validation platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host validation platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with validation platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210, or an operator of validation platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
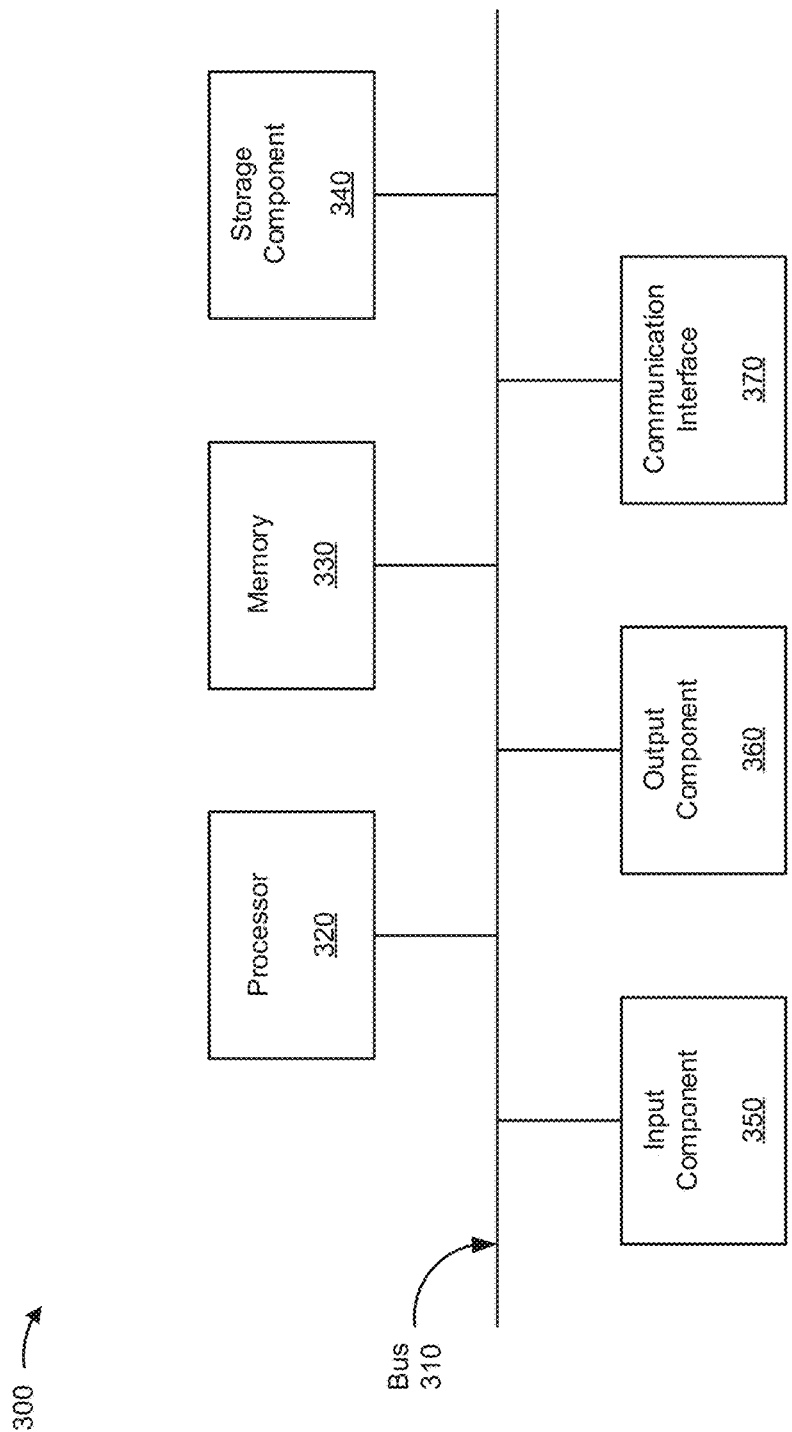
FIG. 3 is a diagram of example components of one or more devices of FIG. 2.

FIG. 3 is a diagram of example components of a device 300. Device 300 may correspond to client device 210, validation platform 220, and/or computing resource 224. In some implementations, client device 210, validation platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
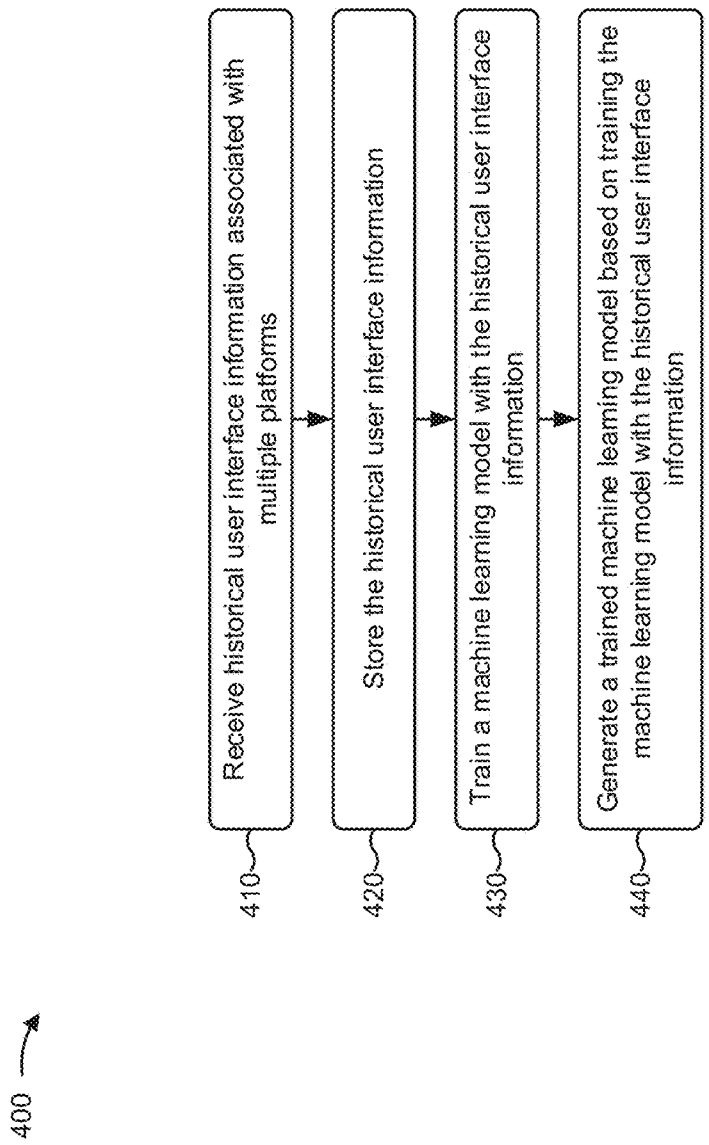
FIG. 4 is a flow chart of an example process for training a machine learning model that is used to automatically visually validate a user interface for multiple platforms.

FIG. 4 is a flow chart of an example process 400 for training a machine learning model that is used to automatically visually validate a user interface for multiple platforms. In some implementations, one or more process blocks of FIG. 4 may be performed by validation platform 220. In some implementations, one or more process blocks of FIG. 4 may be performed by another device or a group of devices separate from or including validation platform 220, such as client device 210.

As shown in FIG. 4, process 400 may include receiving historical user interface information associated with multiple platforms (block 410). For example, validation platform 220 may receive (e.g., using computing resource 224, processor 320, communication interface 370, and/or the like) historical user interface information associated with multiple platforms. In some implementations, validation platform 220 may receive (e.g., from application developers) the historical user interface information. In some implementations, validation platform 220 may retrieve the historical user interface information from a data structure, such as a database. In some implementations, a device may provide the historical user interface information to validation platform 220 (e.g., without validation platform 220 requesting the historical user interface information).

In some implementations, the historical user interface information may be used to train a machine learning model, and may include information indicating how prior user interfaces of prior applications visually appear on different platforms. In some implementations, the historical user interface information may include images of the prior user interfaces for the different platforms, information indicating the different platforms for the prior user interfaces, code used to generate the prior user interfaces, and/or the like.

In this way, validation platform 220 may receive the historical user interface information associated with the multiple platforms.

As further shown in FIG. 4, process 400 may include storing the historical user interface information (block 420). For example, validation platform 220 (e.g., using computing resource 224, processor 320, communication interface 370, and/or the like) may store the historical user interface information. In some implementations, validation platform 220 may store the historical user interface information in a data structure, such as a database, a table, a linked list, and/or the like associated with validation platform 220. In some implementations, the data structure may include an application name field for storing application names, a user interface identifier (ID) field for storing user interface identifiers, an image field for storing user interface images, a platform field for storing information identifying platforms, and/or the like, associated with the historical user interface information. In some implementations, validation platform 220 may securely store the historical user interface information in the data structure as described above in connection with FIG. 1B.

In this way, validation platform 220 may store the historical user interface information.

As further shown in FIG. 4, process 400 may include training a machine learning model with the historical user interface information (block 430). For example, validation platform 220 (e.g., using computing resource 224, processor 320, communication interface 370, and/or the like) may train a machine learning model with the historical user interface information. In some implementations, the machine learning model may include a color selection model, a Canny edge model, a region of interest model, a Hough transform line detection model, a discriminant analysis model, a k-nearest neighbors model, an artificial neural network model, a non-linear regression model, a decision tree model, a fuzzy logic model, and/or the like.

In some implementations, the color selection model may identify objects in images (e.g., images of user interfaces) based on colors of the images. For example, the color selection model may include defining the images based on a red, green, blue (RGB) color model, a hue, saturation, and lightness (HSL) color model, a hue, saturation, and value (HSV) color model, and/or the like, to identify objects having significant color differences from adjacent objects, backgrounds, and/or the like. In some implementations, the color selection model may isolate particular colors (e.g., colors that have been identified in another platform for a same user interface, colors that have been selected as relevant to a particular user interface or to user interfaces associated with a particular website, and/or the like) by masking other colors that do not fall into a same RGB, HSL, or HSV range as the particular colors. Additionally, or alternatively, the color selection model may convert an image from one color model to another (e.g., from the RGB color space to the HSL or HSV color space) to identify objects in the images.

In some implementations, the Canny edge model may identify objects in images (e.g., images of user interfaces) based on an upper threshold and a lower threshold. If a pixel gradient is higher than the upper threshold, then the pixel is accepted as an edge. If a pixel gradient value is below the lower threshold, then the pixel is rejected as an edge. If the pixel gradient is between the two thresholds, then the pixel is accepted as an edge if the pixel is connected to a pixel that is above the upper threshold. In some implementations, the Canny edge model may apply a Gaussian filter (e.g., perform a Gaussian blur function) to smooth the image and remove noise from the image. Additionally, or alternatively, the Canny edge model may determine an intensity gradient to determine angles of edges in the image and to round angles (e.g., to 0°, 45°, 90°, and 135° to classify the edges as horizontal, vertical, or diagonal), and may apply non-maximum suppression to thin the edges by suppressing gradient values except for those that indicate locations with a sharpest change of intensity value. In some implementations, after applying non-maximum suppression, the Canny edge model may filter out edge pixels having a weak gradient value and preserve edge pixels having a high gradient value based on the upper threshold and the lower threshold, as described above. In some implementations, the Canny edge model may apply edge tracking by hysteresis (e.g., may apply a blob analysis) to suppress edges that are weak and not connected to strong edges.

In some implementations, the region of interest model may identify objects in images (e.g., images of user interfaces) based on focusing on an area of interest in the images. For example, the region of interest model may define a portion of an image within which to identify the objects, within which to apply functions associated with identifying the objects, and/or the like. In some implementations, the region of interest model may focus on the area of interest in the image by creating a mask (e.g., a binary image that is the same size as the image to be processed), setting to one those pixels that define the region of interest, and setting all other pixels to zero. In some implementations, the region of interest model may define multiple regions of interest within an image in a similar fashion.

In some implementations, the Hough transform line detection model may identify objects in images (e.g., images of user interfaces) based on determining imperfect instances of objects (e.g., in an image) within a certain class of shapes by a voting procedure. The voting procedure may be carried out in a parameter space, from which object candidates are obtained as local maxima in an accumulator space that is constructed by the Hough transform. The Hough transform line detection model may use a two-dimensional array, called an accumulator, to detect the existence of a line described by $r = x \cos \theta + y \sin \theta$. For each pixel at $(x, y)$ and its neighborhood, the Hough transform algorithm may determine if there is enough evidence of a straight line at that pixel to satisfy a threshold and, if so, the Hough transform algorithm may calculate the parameters $(r, \theta)$ of that line, identify an accumulator bin that the parameters fall into, and increment the value of the accumulator bin. By finding the bins with the highest values (e.g., by looking for local maxima in the accumulator space), the Hough transform line detection model can extract the most likely lines, and identify the approximate geometric definitions of those lines. The final result of the linear Hough transform is a two-dimensional array (matrix) similar to the accumulator, where one dimension of this matrix is the quantized angle $\theta$ and the other dimension is the quantized distance $r$. In this case, each element of the matrix may have a value equal to the sum of the points or pixels that are positioned on the line represented by quantized parameters $(r, \theta)$, and the element with the highest value may indicate the straight line that is most represented in the input image.

In some implementations, the discriminant analysis model may build a predictive model for group membership. The predictive model may be composed of a discriminant function (or, for more than two groups, a set of discriminant functions) based on linear combinations of predictor variables that provide the best discrimination between the groups. In some implementations, the discriminant analysis model may generate the discriminant functions from a sample of cases for which group membership is known. The discriminant analysis model can then apply the discriminant functions to new cases that have measurements for the predictor variables, but have unknown group membership. In some implementations, the discriminant analysis model may apply linear discriminant analysis to identify a linear combination of features that characterizes or separates two or more classes of objects, and the discriminant analysis model may use the linear combination of features as a linear classifier, for dimensionality reduction, or the like, before later classification.

In some implementations, the k-nearest neighbors model may use a k-nearest neighbors algorithm to perform machine learning (e.g., pattern recognition). A k-nearest neighbors algorithm is a non-parametric method that may be used for classification (where the output is a class membership) in which an object is classified by a majority vote of its neighbors, with the object being assigned to the class most common among its k nearest neighbors, or may be used for regression (where the output is the property value for the object) in which the value is the average of the values of its k nearest neighbors. Additionally, weights may be assigned to the contributions of the neighbors, so that the nearer neighbors contribute more to the average of the values than the more distant neighbors.

In some implementations, the artificial neural network model may use an artificial neural network to perform machine learning. An artificial neural network utilizes a collection of connected units or nodes called artificial neurons. Each connection between artificial neurons can transmit a signal from one artificial neuron to another artificial neuron. The artificial neuron that receives the signal can process the signal and then provide a signal to artificial neurons connected to the artificial neuron. In some artificial neural network implementations, the signal at a connection between artificial neurons is a real number, and the output of each artificial neuron is calculated by a non-linear function of the sum of its inputs. Artificial neurons and connections typically have a weight that adjusts as learning proceeds. The weight may increase or decrease the strength of the signal at a connection. Additionally, an artificial neuron may have a threshold such that the artificial neuron only sends a signal if the aggregate signal satisfies the threshold. Typically, artificial neurons are organized in layers, and different layers may perform different kinds of transformations on their inputs.

In some implementations, the non-linear regression model may apply non-linear regression analysis to perform machine learning. Non-linear regression is a form of regression analysis in which observational data are modeled by a function which is a non-linear combination of the model parameters and depends on one or more independent variables. The data are fitted by a method of successive approximations. The non-linear function may be, for example, an exponential function, a logarithmic function, a trigonometric function, a power function, a Gaussian function, and/or the like.

In some implementations, the decision tree model may use a decision tree data structure to perform machine learning. A decision tree data structure classifies a population into branch-like segments that form an inverted tree with a root node, internal nodes, and leaf nodes. For example, the decision tree learning model may use a decision tree as a predictive model to map observations about an item (represented in the branches of the tree data structure) to conclusions about the item target value (represented in the leaves of the tree data structure). The process of building a decision tree may include partitioning the data set into subsets, shortening of branches of the tree, and selecting a tree (e.g., the smallest tree) that fits the data. In some implementations, a decision tree model may be a classification tree (where the target variable can take a discrete set of values) in which leaves represent class labels and branches represent conjunctions of features that lead to those class labels. Alternatively, a decision tree model may be a regression tree (where the target variable can take continuous values, such as real numbers).

In some implementations, the fuzzy logic model may apply fuzzy logic to perform machine learning. Fuzzy logic is a form of many-valued logic in which the truth values of variables may be any real number between zero and one. Fuzzy logic may be employed to represent the concept of partial truth, where the truth value may range between completely true and completely false, as opposed to Boolean logic, where the truth values of variables may only be the integer values zero or one, representing only absolute truth or absolute falseness. The fuzzy logic model may include variations of existing machine learning techniques in which fuzzy logic is applied.

In some implementations, validation platform 220 may train the machine learning model by providing the historical user interface information (e.g., training data) to the machine learning model, and receiving predictions (e.g., indicating whether the prior user interfaces of prior applications visually appear correct on different platforms) based on providing the historical user interface information to the machine learning model. Based on the predictions, validation platform 220 may update the machine learning model, and may provide the historical user interface information to the updated machine learning model. Validation platform 220 may repeat this process until correct predictions are generated by the machine learning model. In some implementations, validation platform 220 may train one or more of the machine learning models (e.g., the color selection model, the Canny edge model, the region of interest model, the Hough transform line detection model, the discriminant analysis model, the k-nearest neighbors model, the artificial neural network model, the non-linear regression model, the decision tree model, the fuzzy logic model, and/or the like) as described in connection with block 430.

In this way, validation platform 220 may train the machine learning model with the historical user interface information.

As further shown in FIG. 4, process 400 may include generating a trained machine learning model based on training the machine learning model with the historical user interface information (block 440). For example, validation platform 220 (e.g., using computing resource 224, processor 320, communication interface 370, and/or the like) may generate a trained machine learning model based on training the machine learning model with the historical user interface information. In some implementations, once the correct predictions are generated by the machine learning model, validation platform 220 may output or generate the final version of the machine learning model as a trained machine learning model (e.g., a trained color selection model, a trained Canny edge model, a trained region of interest model, a trained Hough transform line detection model, and/or the like). In some implementations, validation platform 220 may utilize the trained machine learning model to automatically visually validate a user interface for multiple platforms.

In some implementations, validation platform 220 may not utilize the trained machine learning model to automatically visually validate a user interface for multiple platforms (e.g., to identify differences between two images). In such implementations, validation platform 220 may utilize the trained machine learning model to identify whether any differences in the two images are within tolerances for an enterprise, regarding individual aspects of design elements and a layout as a whole in view of the individual aspects. Validation platform 220 may utilize the trained machine learning model to determine whether a user interface meets design requirements or standards that are not embodied in a design image file (e.g., to determine whether the user interface is compliant without performing a pixel by pixel comparison).

In this way, validation platform 220 may generate the trained machine learning model based on training the machine learning model with the historical user interface information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
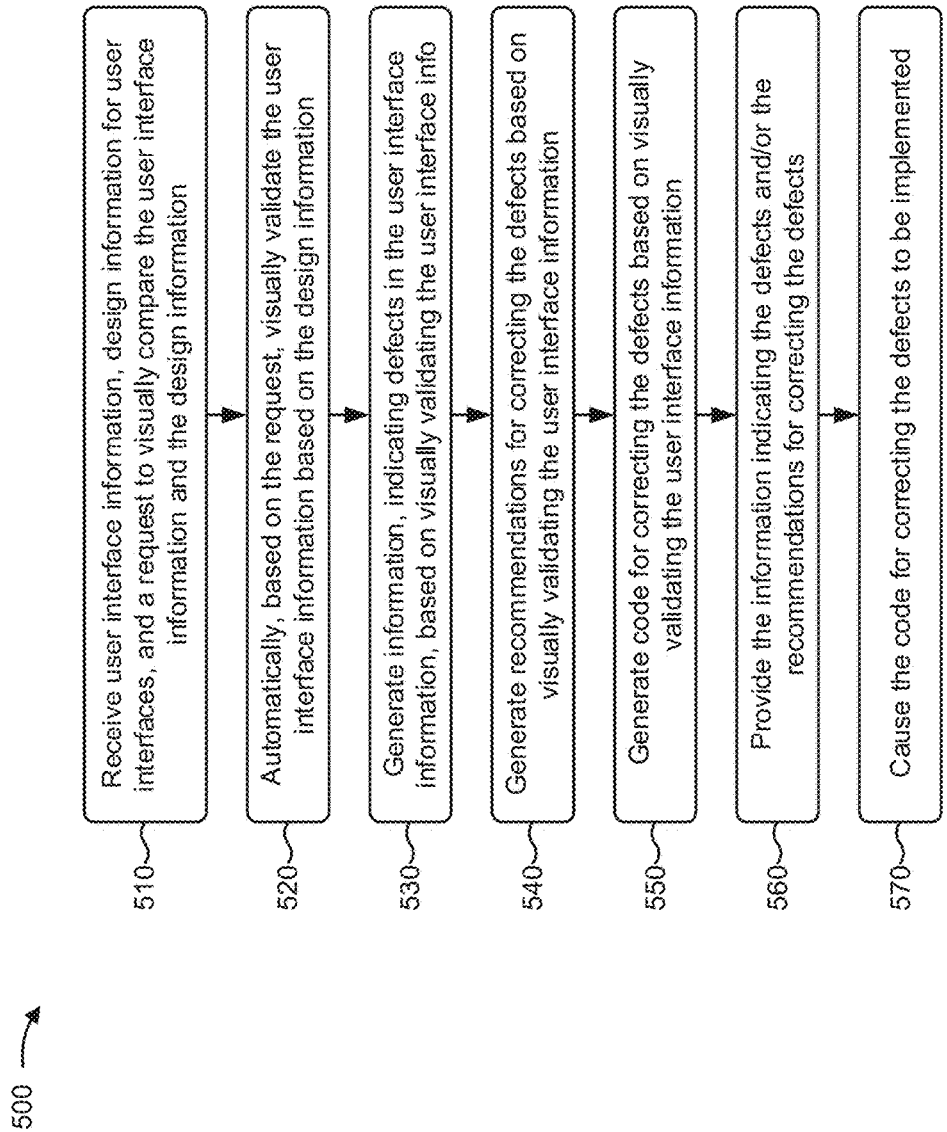
FIG. 5 is a flow chart of an example process for automatically visually validating a user interface for multiple platforms.

FIG. 5 is a flow chart of an example process 500 for automatically visually validating a user interface for multiple platforms. In some implementations, one or more process blocks of FIG. 5 may be performed by validation platform 220. In some implementations, one or more process blocks of FIG. 5 may be performed by another device or a group of devices separate from or including validation platform 220, such as client device 210.

As shown in FIG. 5, process 500 may include receiving user interface information, design information for user interfaces, and a request to visually compare the user interface information and the design information (block 510). For example, validation platform 220 (e.g., using computing resource 224, processor 320, communication interface 370, and/or the like) may receive user interface information, design information for user interfaces, and a request to visually compare the user interface information and the design information. In some implementations, a user may cause client device 210 to provide, to validation platform 220, a request to visually validate a user interface for an application, and validation platform 220 may receive the request. In some implementations, the user may also cause client device 210 to provide user interface information to validation platform 220, and validation platform 220 may receive the user interface information. In some implementations, validation platform 220 may automatically receive the request and the user interface information based on a schedule, a checkpoint in a development process, a trigger generated when changes are made to a user interface, and/or the like.

In some implementations, the user interface information may include an image of the user interface, information indicating the platform for the user interface, code used to generate the user interface, metadata associated with the user interface, special instructions associated with the user interface (e.g., should be visually the same for all platforms), and/or the like. In some implementations, the user need not specify the platform, and validation platform 220 may test the user interface against all (or subsets of) platforms (e.g., in parallel) and identify which platforms have issues.

In some implementations, validation platform 220 may receive design information for user interfaces of the application. The design information may include information indicating how the user interfaces of the application are to visually appear on different platforms. In some implementations, the design information may include images of the user interfaces for the different platforms, information indicating the different platforms for the user interfaces, metadata associated with the user interfaces, special instructions associated with the user interfaces, and/or the like. In some implementations, validation platform 220 may test the user interface against the different platforms (e.g., in parallel) indicated in the design information, and may identify which platforms have issues.

In some implementations, validation platform 220 may emulate the multiple platforms (e.g., without receiving a request from client device 210), and may execute code to generate user interfaces for each of the multiple platforms. In such implementations, validation platform 220 may perform a screen capture of the generated user interfaces, and the screen captures may correspond to the user interface information. In some implementations, validation platform 220 may dynamically generate the user interface information based on anticipated interactions with the user interfaces. For example, validation platform 220 may generate and execute a script that simulates user interactions with the user interfaces so that multiple pages and other aspects of the user interfaces may be tested (e.g., rather than just testing a static page of the user interface).

In this way, validation platform 220 may receive the user interface information, the design information for user interfaces, and the request to visually compare the user interface information and the design information.

As further shown in FIG. 5, process 500 may include automatically, based on the request, visually validating the user interface information based the design information (block 520). For example, validation platform 220 (e.g., using computing resource 224, processor 320, communication interface 370, and/or the like) may automatically, based on the request, visually validate the user interface information based the design information. In some implementations, validation platform 220 may utilize the trained machine learning model, with the user interface information and the design information, in order to visually compare the user interface information and the design information. In some implementations, the trained machine learning model may visually compare the user interface information and the design information in order to determine whether the user interface information visually matches the design information. In some implementations, if the user interface information matches the design information, validation platform 220 (e.g., via the trained machine learning method) may generate information indicating that the user interface information matches the design information. In such implementations, the user interface may be ready to be implemented in the platform identified in the user interface information.

In some implementations, validation platform 220 may visually compare each pixel of the user interface image with each corresponding pixel of a design user interface image in order to determine whether the user interface information visually matches the design information. For example, validation platform 220 may render the user interface image, and may overlay the user interface image on top of approved design images. In some implementations, validation platform 220 may visually validate content of the user interface, a layout of the user interface, visual animations of the user interface, and/or the like. In some implementations, validation platform 220 may simulate user interactions with the user interface when visually validating the user interface (e.g., as described elsewhere herein), and may visually validate the user interface for multiple platforms at the same time. In some implementations, validation platform 220 may visually validate user interfaces associated with angular applications (e.g., angular web applications) and non-angular applications (e.g., non-angular web applications).

In some implementations, the trained machine learning model may include a trained color selection model, a trained Canny edge model, a trained region of interest model, a trained Hough transform line detection model, a trained discriminant analysis model, a trained k-nearest neighbors model, a trained artificial neural network model, a trained non-linear regression model, a trained decision tree model, a trained fuzzy logic model, and/or the like, described elsewhere herein.

In some implementations, validation platform 220 may utilize one or more of the trained machine learning models, and each trained machine learning model may produce a result identifying issues (e.g., different issues) with the user interface. In some implementations, the results of the trained machine learning models may be aggregated by validation platform 220 and used to correct the issues with the user interface. In some implementations, validation platform 220 may select particular machine learning models based on characteristics of the user interface (e.g., a user interface with more text than images may utilize a first machine learning model, whereas a user interface with more images than text may utilize a second machine learning model). In such implementations, validation platform 220 may aggregate results of the selected machine learning models, and may use the aggregated results to correct the issues with the user interface.

In this way, validation platform 220 may automatically, based on the request, visually validate the user interface information based the design information.

As further shown in FIG. 5, process 500 may include generating information, indicating defects in the user interface information, based on visually validating the user interface information (block 530). For example, validation platform 220 (e.g., using computing resource 224, processor 320, communication interface 370, and/or the like) may generate information, indicating defects in the user interface information, based on visually validating the user interface information. In some implementations, if the user interface information does not match the design information, validation platform 220 (e.g., via the trained machine learning model) may generate information indicating defects in the user interface information. In such implementations, the user interface may not be ready to be implemented in the platform identified in the user interface information until the defects are corrected. In some implementations, the defects may include textual defects (e.g., defects in text font, text type, text size, text color, and/or the like), formatting defects (e.g., incorrect layout of text and/or images in the user interface, incorrect sizes of text and/or images in the user interface, incorrect locations of text and/or images in the user interface, scaling defects associated with the user interface, sizing defects associated with the user interface, content discrepancy defects associated with the user interface, alignment defects associated with the user interface, and/or the like), image defects (e.g., improper coloring of an image, improper orientation of an image, overlapping image defects associated with the user interface, and/or the like) and/or the like.

In some implementations, as discussed above, validation platform 220 may utilize one or more of the trained machine learning models, and each trained machine learning model may produce a result identifying issues with the user interface, as compared to the design information. In some implementations, the results of the trained machine learning models may be aggregated by validation platform 220 and used to correct the issues with the user interface.

In this way, validation platform 220 may generate the information, indicating the defects in the user interface information, based on visually validating the user interface information.

As further shown in FIG. 5, process 500 may include generating recommendations for correcting the defects based on visually validating the user interface information (block 540). For example, validation platform 220 (e.g., using computing resource 224, processor 320, communication interface 370, and/or the like) may generate recommendations for correcting the defects based on visually validating the user interface information. In some implementations, if the user interface information does not match the design information, validation platform 220 (e.g., via the trained machine learning method) may generate information indicating recommendations for correcting the defects in the user interface information. In some implementations, the recommendations may include recommendations to correct textual defects in the user interface, formatting defects in the user interface, image defects in the user interface, and/or the like. In some implementations, the recommendations may include step-by-step procedures for correcting the defects or less specific instructions for correcting the defects (e.g., move this image to here, change this text to different text, and/or the like).

In this way, validation platform 220 may generate the recommendations for correcting the defects based on visually validating the user interface information.

As further shown in FIG. 5, process 500 may include generating code for correcting the defects based on utilizing the trained machine learning model (block 550). For example, validation platform 220 (e.g., using computing resource 224, processor 320, communication interface 370, and/or the like) may generate code for correcting the defects based on utilizing the trained machine learning model. In some implementations, if the user interface information does not match the design information, validation platform 220 (e.g., via the trained machine learning method) may generate code to correct the defects in the user interface information. In some implementations, the code to correct the defects in the user interface information may include code to correct textual defects in the user interface, code to correct formatting defects in the user interface, code to correct image defects in the user interface, and/or the like.

In some implementations, validation platform 220 may automatically generate code for a complete user interface (or aspects thereof) based on the design information. In such implementations, validation platform 220 may train one or more of the machine learning models, described elsewhere herein, to automatically generate the code for the complete user interface (or aspects thereof) based on the design information.

In this way, validation platform 220 may generate the code for correcting the defects based on utilizing the trained machine learning model.

As further shown in FIG. 5, process 500 may include providing the information indicating the defects and/or the recommendations for correcting the defects (block 560). For example, validation platform 220 may provide the information indicating the defects and/or the recommendations for correcting the defects. In some implementations, validation platform 220 may provide the information about the defects and/or the recommendations for correcting the defects to client device 210. Client device 210 may receive the information about the defects and/or the recommendations for correcting the defects, and may provide the information about the defects and/or the recommendations for correcting the defects for display to the user via a user interface.

In some implementations, validation platform 220 may provide the information about the defects and/or the recommendations for correcting the defects to a storage device (e.g., a data structure) associated with validation platform 220. In some implementations, validation platform 220 may provide the information about the defects and/or the recommendations for correcting the defects to another device (e.g., other than client device 210), such as a device associated with a developer of the application.

In this way, validation platform 220 may provide the information indicating the defects and/or the recommendations for correcting the defects.

As further shown in FIG. 5, process 500 may include causing the code for correcting the defects to be implemented (block 570). For example, validation platform 220 (e.g., using computing resource 224, processor 320, communication interface 370, and/or the like) may cause the code for correcting the defects to be implemented. In some implementations, validation platform 220 may provide the code for correcting the defects in the user interface information to client device 210. Client device 210 may receive the code for correcting the defects, and may provide a user interface for display to the user based on receiving the code for correcting the defects. In some implementations, the user interface may include information inquiring whether the user wants to implement the code for correcting the defects in the user interface information. In some implementations, if the user elects to utilize the code for correcting the defects, client device 210 may cause the code for correcting the defects to be implemented so that the defects in the user interface information are corrected and a correct user interface is output.

In some implementations, if the user elects to utilize the code for correcting the defects, client device 210 may inform validation platform 220 of the decision, and validation platform 220 may cause the code for correcting the defects to be implemented so that the defects in the user interface information are corrected. In some implementations, validation platform 220 may automatically cause the code for correcting the defects to be implemented, without receiving an instruction from the user, so that the defects in the user interface information are corrected. In some implementations, validation platform 220 may test the automatically generated code, utilizing the techniques described above in connection with FIG. 5, to confirm that the code corrects the defects and that the user interface information is compliant with the design information.

In this way, validation platform 220 may cause the code for correcting the defects to be implemented.

In some implementations, validation platform 220 may generate a comparison of images provided by the user interface information and the design information, and may highlight the defects in the image provided by the user interface information. In some implementations, validation platform 220 may generate a composite image, from the images provided by the user interface information and the design information, so that differences between the images can be easily discerned. In such implementations, validation platform 220 may generate visual information that will enable quick and easy identification and correction of defects in the user interface.

In some implementations, validation platform 220 may visually compare the user interface information and the design information for multiple platforms without using physical devices associated with the multiple platforms (e.g., without rendering the user interface and the design user interface on the physical devices).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. For example, blocks 540 and 560 may be omitted, or blocks 550 and 570 may be omitted, or blocks 540-570 may not be omitted.

Some implementations described herein may provide a validation platform that utilizes a machine learning model to automatically visually validate a user interface for multiple platforms. For example, the validation platform may receive user interface information, design information for user interfaces, and a request to visually compare the user interface information and the design information. The validation platform may utilize, based on the request, a trained machine learning model to visually compare the user interface information and the design information, and may generate information, indicating defects in the user interface information, based on utilizing the trained machine learning model. The validation platform may generate recommendations for correcting the defects, and may generate code for correcting the defects. The validation platform may provide, for display, the information indicating the defects and/or the recommendations for correcting the defects, and may cause the code for correcting the defects to be implemented.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, configured to:
      utilize, based on a request, a trained machine learning model to visually compare user interface information and design information,
         the trained machine learning model including at least two or more of:
            a trained color selection model,
            a trained edge detection model,
            a trained region of interest model, or
            a trained line detection model;
      generate information, indicating defects in the user interface information, based on utilizing the trained machine learning model to visually compare the user interface information and the design information; and
      provide for display the information indicating the defects in the user interface information.

2. The device of claim 1, where the design information includes information indicating how user interfaces of an application are to visually appear on multiple platforms.

3. The device of claim 2, where the multiple platforms include two or more of:
   a television,
   a desktop computing device,
   a tablet computing device,
   a handheld device,
   a smartphone device, or
   a wearable device.

4. The device of claim 1, where the one or more processors are further configured to:
   generate one or more recommendations for correcting the defects based on utilizing the trained machine learning model to visually compare the user interface information and the design information; and
   provide the one or more recommendations for display on a client device.

5. The device of claim 1, where the one or more processors are further configured to:
   generate code for correcting the defects, in the user interface information, based on utilizing the trained machine learning model to visually compare the user interface information and the design information; and
   cause the code for correcting the defects in the user interface information to be implemented to correct the defects in the user interface information.

6. The device of claim 1, where the one or more processors are further configured to:
   receive historical user interface information associated with multiple platforms;
   store the historical user interface information; and
   generate the trained machine learning model based on training the machine learning model with the historical user interface information.

7. The device of claim 6, where the historical user interface information includes at least one of:
   images of prior user interfaces for the multiple platforms,
   information indicating the multiple platforms for the prior user interfaces, or
   code used to generate the prior user interfaces.

8. A method, comprising:
   utilizing, by a device and based on a request from a client device, a trained machine learning model to visually compare user interface information and design information,
      the trained machine learning model including at least two or more of:
         a trained color selection model,
         a trained edge model,
         a trained region of interest model, or
         a trained line detection model;
   generating, by the device, information, indicating defects in the user interface information, based on utilizing the trained machine learning model to visually compare the user interface information and the design information,
      the defects including user interface information that does not visually match the design information; and
   providing, by the device, the information indicating defects in the user interface information for display to the client device.

9. The method of claim 8, further comprising:
   receiving historical user interface information associated with multiple platforms;
   storing the historical user interface information; and
   generating the trained machine learning model based on training the machine learning model with the historical user interface information.

10. The method of claim 9, where storing the historical user interface information comprises:
    applying a cryptographic hash function to the design information and the historical user interface information; and
    storing the cryptographic hash function.

11. The method of claim 8, where the design information includes a design of a user interface to be provided for multiple platforms, the multiple platforms including different display areas for displaying the user interface.

12. The method of claim 11, where the user interface information includes:
an image of the user interface for each of the multiple platforms, and
information indicating the multiple platforms.

13. The method of claim 8, further comprising:
generating one or more recommendations for correcting the defects based on utilizing the trained machine learning model to visually compare the user interface information and the design information; and
providing the one or more recommendations for display to the client device.

14. The method of claim 8, further comprising:
generating code for correcting the defects, in the user interface information, based on utilizing the trained machine learning model to visually compare the user interface information and the design information; and
utilizing the code to automatically correct the defects in the user interface information.

15. A non-transitory computer-readable medium storing instructions, the instructions comprising:
one or more instructions that, when executed by one or more processors of a device, cause the one or more processors to:
receive historical user interface information associated with multiple platforms,
the multiple platforms including different display areas for displaying a same user interface;
train a machine learning model with the historical user interface information;
generate a trained machine learning model based on training the machine learning model with the historical user interface information,
the trained machine learning model including at least two or more of:
a trained color selection model,
a trained edge model,
a trained region of interest model, or
a trained line detection model;
utilize, based on a request, the trained machine learning model to visually compare user interface information and design information;
generate information, indicating defects in the user interface information, based on utilizing the trained machine learning model to visually compare the user interface information and the design information, the defects including user interface information that does not visually match the design information; and
provide for display the information indicating the defects in the user interface information.

16. The non-transitory computer-readable medium of claim 15, where the one or more instructions, when executed by the one or more processors, further cause the one or more processors to:
store the historical user interface information; and
where the one or more instructions, that cause the one or more processors to store the historical user interface information, cause the one or more processors to:
apply a cryptographic hash function to the design information and the historical user interface information; and
store the cryptographic hash function.

17. The non-transitory computer-readable medium of claim 15, where the one or more instructions, when executed by the one or more processors, further cause the one or more processors to:
generate one or more recommendations for correcting the defects based on utilizing the trained machine learning model to visually compare the user interface information and the design information; and
provide the one or more recommendations.

18. The non-transitory computer-readable medium of claim 15, where the one or more instructions, when executed by the one or more processors, further cause the one or more processors to:
generate code for correcting the defects, in the user interface information, based on utilizing the trained machine learning model to visually compare the user interface information and the design information; and
cause the code for correcting the defects in the user interface information to be implemented.

19. The non-transitory computer-readable medium of claim 15, where the one or more instructions, when executed by the one or more processors, further cause the one or more processors to:
automatically correct the defects in the user interface information based on the information indicating defects in the user interface information.

20. The non-transitory computer-readable medium of claim 15, where the user interface information includes:
a user interface image of the user interface for a particular platform, and
information indicating the particular platform.

* * * * *